(12) United States Patent
    Hu (10) Patent No.: US 10,133,107 B2
(45) Date of Patent: Nov. 20, 2018

(54) DISPLAY DEVICE AND TERMINAL

(71) Applicant: YULONG COMPUTER TELECOMMUNICATION SCIENTIFIC (SHENZHEN) CO., LTD., Shenzhen (CN)

(72) Inventor: Yun Hu, Shenzhen (CN)

(73) Assignee: YULONG COMPUTER TELECOMMUNICATION SCIENTIFIC, Shenzhen (CN)

( * ) Notice: Subject to any disclaimer, the term of this patent is extended or adjusted under 35 U.S.C. 154(b) by 15 days.

(21) Appl. No.: 15/328,172

(22) PCT Filed: Jul. 16, 2015

(86) PCT No.: PCT/CN2015/084247
    § 371 (c)(1),
    (2) Date: Jan. 23, 2017

(87) PCT Pub. No.: WO2016/015567
    PCT Pub. Date: Feb. 4, 2016

(65) Prior Publication Data
    US 2017/0212377 A1   Jul. 27, 2017

(30) Foreign Application Priority Data

Jul. 31, 2014  (CN) .................. 2014 2 0430512 U
    May 15, 2015   (CN) .................. 2015 1 0249685

(51) Int. Cl.
    *G02F 1/1333*   (2006.01)
    *G06F 3/041*    (2006.01)
    *G06F 1/16*     (2006.01)

(52) U.S. Cl.
    CPC ........ *G02F 1/13338* (2013.01); *G06F 1/1601* (2013.01); *G06F 3/041* (2013.01); *G02F 2001/133311* (2013.01)

(58) Field of Classification Search
    CPC ..... G02F 1/13338; G02F 2001/133311; G06F 3/041; G06F 1/1601
    (Continued)

(56) References Cited

U.S. PATENT DOCUMENTS 9,616,625 B2 *  4/2017  Allore .............. B29D 11/00009
    2007/0229475 A1 * 10/2007 Gettemy .............. G06F 1/1626
                                                           345/173

(Continued)

*Primary Examiner* — Charles Chang
(74) *Attorney, Agent, or Firm* — ScienBiziP, P.C.

(57) ABSTRACT

A display device is provided. The display device includes a face housing, a touch device and a protective cover plate. The face housing includes a bottom wall and a side wall; a cavity is formed by the surrounding of the bottom wall and the side wall; the side wall includes a first positioning surface which is a curved surface. The touch device is within the cavity and the protective cover plate is arranged to be attached to the touch device. The protective cover plate includes a second positioning surface which is a curved surface; and the second positioning surface is attached to the first positioning surface, so that the protective cover plate is attached to the face housing. The first positioning surface is set on the face housing and curved surface, the second positioning surface is correspondingly set on the protective cover plate and curved surface. As the positioning action of the second positioning surface and the first positioning surface, the protective cover plate is accurately attached to the face housing when attaching. The problem of misplacement or displacement in the attaching process of the protective cover plate and the face housing is avoided. A terminal is also provided.

4 Claims, 5 Drawing Sheets

(58) Field of Classification Search
USPC .......................................................... 349/58
See application file for complete search history.

(56) References Cited

U.S. PATENT DOCUMENTS

| | | | |
|---|---|---|---|
| 2011/0049139 A1* | 3/2011 | Jiang ..................... | G06F 1/1626 |
| | | | 220/4.01 |
| 2011/0111176 A1* | 5/2011 | Chiu ....................... | B32B 3/02 |
| | | | 428/157 |
| 2011/0148784 A1* | 6/2011 | Lee ...................... | G06F 1/1601 |
| | | | 345/173 |
| 2013/0140965 A1* | 6/2013 | Franklin ............... | G06F 1/1626 |
| | | | 312/223.1 |

* cited by examiner

DISPLAY DEVICE AND TERMINAL

CROSS-REFERENCE TO RELATED APPLICATIONS

This application claims priority of Chinese Patent Application No. 201420430512.7, entitled "Surface shell and protective cover plate connecting structure and liquid crystal display touch phone," filed on Jul. 31, 2014, and Chinese Patent Application No. 201510249685.8, entitled "Display device and terminal," filed on May 15, 2015 in the SIPO (State Intellectual Property Office of the People's Republic of China), the entire contents of which are incorporated by reference herein.

FIELD

The present disclosure generally relates to electronic communication technology, and specifically to a display device and a terminal.

BACKGROUND

Figure 1:
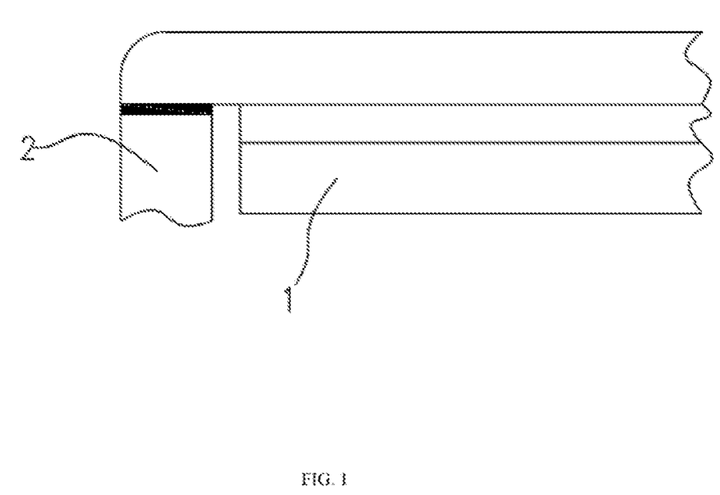
FIG. 1 is a structural diagram of a display device in prior art.

At present, a liquid crystal display module of a touch screen phone is attached into a middle frame of a shell directly. As shown in FIG. 1, a liquid crystal display module 1 is attached into a middle frame of a shell 2. However, as using a surface to surface joint, there is no fixed position between the liquid crystal display module 1 and the middle frame of the shell 2, and dislocation and displacement may occur during assembly. Moreover, the middle frame of the shell 2 and the liquid crystal display module 1 being attached to each other via surfaces, a leakage of light of the liquid crystal display module 1 from the border of the middle frame of a shell 2 may happen.

Although there are some phones that have positioning structure in the middle frame of the shell to fix the liquid crystal display module and the middle frame of the shell, the additional positioning structure not only increases the assembling between parts, but also occupies gap in the middle frame of the shell. Thus, it is not conducive to decrease weight and thickness of the phones.

SUMMARY

The present disclosure provides a display device, to improve upon technical problems of positioning difficulties and light leakage appearing on the liquid crystal display module and the middle frame of a shell of the existing display devices. Specifically, a display device is provided.

The display device includes:
  a display device, comprising: a surface shell, a touch device and a protective cover plate, the surface shell comprising a bottom wall and a sidewall, the bottom wall and the sidewall enclose a cavity, the sidewall comprising a first locating surface, the first locating surface being a curved surface, the touch device being set inside the cavity, the protective cover plate and the touch device being arranged to attach to each other, the protective cover plate comprising a second locating surface, the second locating surface being a curved surface, the second locating surface attaches to the first locating surface so that the protective cover plate and the surface shell are stuck to each other.

Wherein, both of the first locating surface and the second locating surface include a first part and a second part, the first part forms an angle with the second part.

Wherein, both of the first part and the second part are cambered surfaces.

Wherein, both of the first part and the second part are stepped surfaces.

Wherein, the touch device includes a touch panel and a liquid crystal panel placed below the protective cover plate in sequence, and there are predetermined gap between the protective cover plate and the touch panel, and between the touch panel and the liquid crystal panel, and between the liquid crystal and the surface shell.

Wherein, the touch panel and the liquid crystal panel have a same width, predetermined gap exists between an exterior wall and a sidewall of the touch panel, and the same predetermined gap exists between an exterior wall and a sidewall of the liquid crystal panel.

Wherein, a range of the predetermined gap is between 0.3 mm to 0.4 mm.

Wherein, the liquid crystal panel includes a display area, a distance from the display area to an edge of the liquid crystal panel being between 1.0 mm to 1.1 mm.

Wherein, the protective cover plate is set with rounded corner around, the liquid crystal panel includes a non-display area, and a center of the rounded corner is directly above the non-display area.

Accordingly, the present disclosure also provides a terminal having the above-mentioned display device.

Compared with the prior art, the present disclosure provides the display device, arranging the first locating surface on the sidewall of the surface shell, and accordingly arranging the second locating surface on the protective cover plate. Both of the first locating surface and the second locating surface are curved surfaces, and through the locating effect of the second locating surface and the first locating surface, the protective cover plate and the surface shell can be accurately stuck to each other. Since both of the first locating surface and the second locating surface are curved surfaces, the curved surfaces play a positioning role in assembly. The dislocation or displacement caused by the protective cover plate and the surface shell being adhered to each other are avoided. In addition, leakage of light from the border of the surface shell is prevented when lights of the liquid crystal panel of the touch device reflect to the protective cover plate. Using a positioning structure on both the surface shell and on the protection cover plate provides a simple structure, and simplifies the assembly between parts.

BRIEF DESCRIPTION OF THE DRAWINGS

For more clarity of illustration of technical solution of the present disclosure, the drawings for use in the exemplary embodiments of the present disclosure will be introduced briefly hereinafter, obviously, the drawings are described below are just some exemplary embodiments of the present disclosure, as will be appreciated by one skilled in the art, on the premise of not paying a creative work, other drawings can be acquired according to the drawings.

DETAILED DESCRIPTION

Combined with the drawings of the exemplary embodiments of the present disclosure hereinafter, to describe the technical solution of the exemplary embodiments of the present disclosure clearly and completely. Obviously, the exemplary embodiments are described are just some exemplary embodiments of the present disclosure, but not the all exemplary embodiments. Based on the exemplary embodiments of the present disclosure. It must be understood by those of ordinary skill in the art that on the premise of not pay a creative work, all other exemplary embodiments acquired belong to the scope of protection of the claims of this present disclosure.

Figure 2:
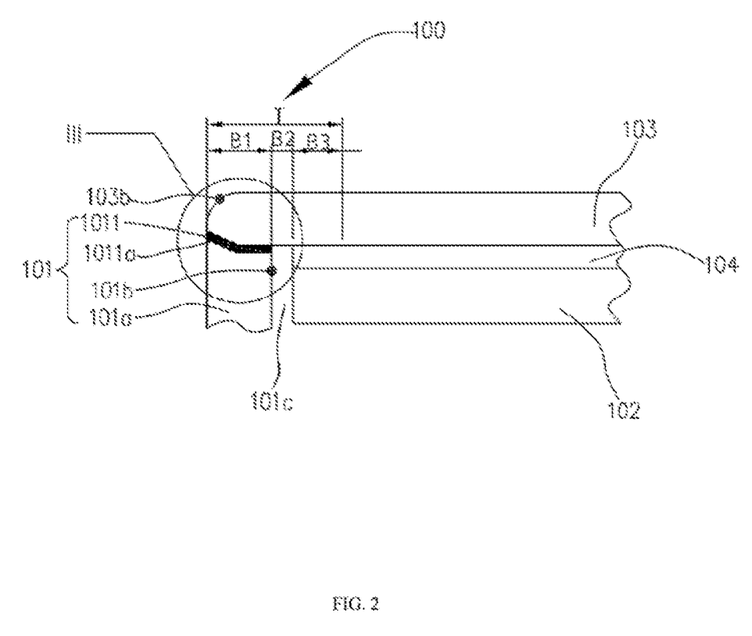
FIG. 2 is a structural diagram of a display device provided in a first exemplary embodiment of the present disclosure.
Figure 3:
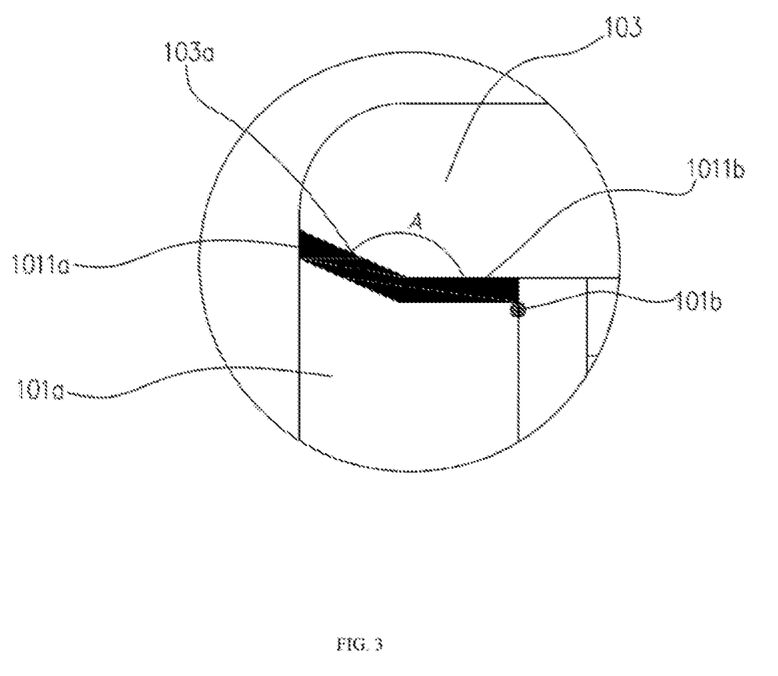
FIG. 3 is a partial enlarged drawing as viewed from line III in FIG. 2.

As shown in FIG. 2 and FIG. 3, the first exemplary embodiment of the present disclosure provides a terminal, which includes a display device 100. In the exemplary embodiment, the terminal can be a mobile phone, a tablet computer, or a personal digital assistant (PDA), or any other smart device.

The display device 100 includes a surface shell 101, a touch device 102, and a protective cover plate 103. The touch device 102 can be placed inside the surface shell 101, the protective cover plate 103 can be integrally formed and adhesively attached to the touch device 102, thereby the protective cover plate 103 and the touch device 102 can be integrated as one and adhesively attached to the surface shell 101, and then the touch device 102 can be packaged and protected. At the same time, when a user is observing the surface shell 101 in a direction of an operation surface of the surface shell 101, the protective cover plate 103 can block a border 101*a* of the surface shell 101 completely to hide the border 101*a* correspondingly in the operation surface. This allows the width of the surface shell 101 to be used reasonably and unnecessary size requirement can be reduced.

In the exemplary embodiment, materials of the surface shell 101 can be metal or plastic. The border 101*a* can be arranged around the surface shell 101. For strength of the surface shell 101, the width of the border 101*a* is at least 0.5 millimeter.

The surface shell 101 includes a bottom wall (not shown in drawings) and a sidewall 101*b*. The bottom wall and the sidewall 101*b* can enclose a cavity 101*c*. In the exemplary embodiment, the cavity 101*c* can be square in shape.

The sidewall 101*b* includes a first locating surface 1011, which is a curved surface. In the exemplary embodiment, the first locating surface 1011 is a tilted curved surface, and the first locating surface 1011 is arranged around the bottom wall. The first locating surface 1011 includes a first part 1011*a* and a second part 1011*b*, and an angle A is formed between the first part 1011*a* and the second part 1011*b*. In detail, the second part 1011*b* is horizontal, the first part 1011*a* leans against the second part 1011*b* to form the angle A, and the angle A can be about 135 degrees or about 145 degrees. Moreover, the first locating surface 1011 can be formed by computer numerical control (CNC) lathe process.

The touch device 102 can be set inside the cavity 101*c*. In the exemplary embodiment, the touch device 102 is set inside the border 101*a* of the surface shell 101, and includes a touch panel and a liquid crystal panel (not shown in drawings). The touch panel and liquid crystal panel are placed below the protective cover plate 103 in sequence. Bottom of the protective cover plate 103 and top of the touch panel can be spaced, and there is a certain gap between the bottom of the protective cover plate 103 and the top of the touch panel. The gap can be filled with glue 104, to connect the protective cover plate 103 and the touch panel. Meanwhile, the glue 104 can act as a buffer, to alleviate an injury to the touch panel caused by impact force. Bottom of the touch panel and top of the liquid crystal panel can be spaced, and there is a certain gap between the bottom of the touch panel and the top of the liquid crystal panel. Bottom of the liquid crystal panel and the surface shell 101 can be spaced, and there is a certain gap between the bottom of the liquid crystal panel and the surface shell 101, so as to separate the liquid crystal panel and the surface shell 101, and facilitate disassembly of the liquid crystal panel and the surface shell 101 subsequently.

A width of the touch panel and a width of the liquid crystal panel can be substantially the same. Predetermined gap sexists between an exterior wall and a sidewall 101*b* of the touch panel, and the same predetermined gap exists between an exterior wall and the sidewall 101*b* of the liquid crystal panel. A range of the predetermined gap is from 0.3 mm to 0.4 mm. Preferably, the predetermined gap is 0.3 mm. It can be understood that, in other exemplary embodiments, the predetermined gap is 0.4 mm or 0.35 mm.

In the exemplary embodiment, the liquid crystal panel includes a display area (not shown in drawings). Distance from the display area to the liquid crystal panel is between 1.0 mm to 1.1 mm. Preferably, the distance from the display area to the liquid crystal panel is 1.0 mm. It can be understood that, in other exemplary embodiments, the distance from the display area to the liquid crystal panel is 1.05 mm or 1.06 mm.

The protective cover plate 103 can be used to protect the touch device 102. In the exemplary embodiment, the protective cover plate 103 is made from toughened glass materials or polymer materials having certain strength. A width of the protective cover plate 103 can be similar to the width of the surface shell 101 (of course, the protective cover plate 103 may be slightly wider than the surface shell 101), to form the border 101*a* of the surface shell 101. Thereby light from a non-display area of the liquid crystal panel can be reflected through the protective cover plate 103, and the border 101*a* of the surface shell 101 can be covered with the protective cover plate 103 completely when the user is looking at the surface shell 101 in the direction of the operation surface of the surface shell 101. The border 101*a* is thus hidden in the operation surface, thereby achieving an effect of a narrow frame or frame-free visual aspect, increasing the display area of the liquid crystal panel greatly, and improving the user experience.

The protective cover plate 103 is glued to the touch device 102. In the exemplary embodiment, the protective cover plate 103 is glued to the touch device 102 through the glue 104, to make the protective cover plate 103 integrally formed with the touch device 102, thereby protecting the touch device 102, and the protective cover plate 103 can be connected to the surface shell 101 conveniently at the same time.

Moreover the protective cover plate 103 includes a second locating surface 103*a*. The second locating surface 103*a* is a curved surface and is adhered to the first locating surface 1011. In the exemplary embodiment, the second locating surface 103*a* and the first locating surface 1011 have the same structure, which is beneficial for adhesion. The second locating surface 103*a* is a tilted curved surface. The structure of the second locating surface 103*a* is the same as the structure of the first locating surface 1011, so it does not need to repeat here. Especially, the second locating surface 103a can be formed by the CNC lathe process.

Adhering the first locating surface 1011 to the second locating surface 103a, the adhesion of the surface shell 101 and the protective cover plate 103 can be simpler. Meanwhile, as the protective cover plate 103 is adhered to the touch device 102 through the glue 104, the touch device 102 can be adhered to the surface shell 101 when already adhered to the protective cover plate 103, thereby preventing dislocation and displacement when attaching the protective cover plate 103 and the touch device 102 to the surface shell 101, and ensuring accuracy of the attachment locations. In addition, since the surface shell 101 and the protective cover plate 103 do not need to be set with positional structures respectively, the overall structure of the display device 100 is more compact, gap is saved at the same time, and complex assembly between parts is reduced.

Further, as the first locating surface 1011 and the second locating surface 103a are both tilted curved surfaces, light will not leak out from the adhesion of the protective cover plate 103 and the surface shell 101, when light from the liquid crystal panel of the touch device 102 is reflected to the protective cover plate 103, thus leakage of light can be avoided and the user experience can be improved.

For a further improvement, the protective cover plate 103 can be set with rounded corners 103b around; and a center of the rounded corners 103b can be located on the top of the non-display area of the liquid crystal panel. In the exemplary embodiment, the rounded corners 103b can be set on a juncture between the side wall and the top of the protective cover plate 103, the center of the rounded corners 103b being directly above or inclined to cover the non-display area. Preferably, the center of the rounded corners 103b is directly above the non-display area. Thus, comfort of the protective cover plate 103 can be promoted, and then the user experience can be improved. Light from the non-display area of the liquid crystal panel can be reflected, and an effect of a narrow frame or frame-free on visual can be achieved when the user is watching.

As shown in FIG. 2, a maximum distance from an edge of a display area of the liquid crystal panel to an exterior edge of the surface shell 101 is T. A width of the border 101a is B1, the predetermined gap between the exterior wall and the sidewall 101b of the touch panel is B2, and the predetermined gap-between the exterior wall and the sidewall 101b of the liquid crystal panel is B2. Distance from the edge of the display area of the liquid crystal panel to the exterior edge of the liquid crystal panel is B3. The value of T is the sum of B1, B2, and B3, wherein a value of B1 is 0.5 mm, a value of B2 is 0.3 mm, and a value of B3 is between 1.0 mm and 1.1 mm (currently, a minimum value of 5.15 inch LCD is 1.0 mm), Distance T thus has a minimum value 1.8 mm (0.5 mm+0.3 mm+1.0 mm=1.8 mm), so it can be able to better achieve an effect of narrowing the border of the display device.

The first exemplary embodiment of the present disclosure provides a display device 100. The first locating surface 1011 is set on the surface shell 101 and the second locating surface 103a is set on the protective cover plate 103, and both of the first locating surface 1011 and the second locating surface 103a are tilted curved surfaces. The first locating surface 1011 and the second locating surface 103a are thus attached accurately to each other because of positioning action of the adhesion of the first locating surface 1011 and the second locating surface 103a, preventing dislocation and displacement. Meanwhile, as the first locating surface 1011 and the second locating surface 103a are both tilted curved surfaces, light will not be leaked out from the adhesion of the protective cover plate 103 and the surface shell 101, when the light from the liquid crystal panel of the touch device 102 is reflected to the protective cover plate 103, the leakage of light is thus reduced, and the user experience can be improved. In addition, as the protective cover plate 103 is slightly wider than the border 101a of the surface shell 101, light from a non-display area of the liquid crystal panel can be reflected out, and an effect of a narrow frame or frame-free on visual can be achieved, and the user experience can be further improved.

Figure 4:
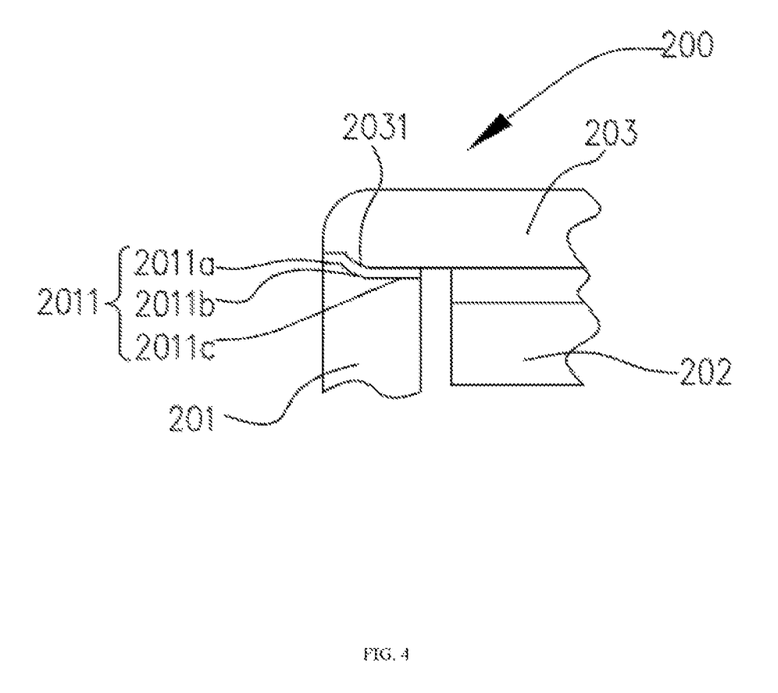
FIG. 4 is a structural diagram of the display device provided in a second exemplary embodiment of the present disclosure.

As shown in FIG. 4, a second exemplary embodiment of the present disclosure provides a display device 200. The display device 200 includes a surface shell 201, a touch device 202 and a protective cover plate 203. A difference between the display device 200 provided in the second exemplary embodiment and the display device 100 provided in the first exemplary embodiment is that: the surface shell 201 includes a first locating surface 2011, and the first locating surface 2011 is a cambered surface. Specifically, the first locating surface 2011 includes a first part 2011a, a second part 2011b, and a third part 2011c. The second part 2011b connects between the first part 2011a and the third part 2011c and the second part 2011b is an arc. Both of the first part 2011a and the third part 2011c are parallel to a horizontal direction. Moreover, the first locating surface 2011 can be formed by the CNC lathe process.

Similarly, the protective cover plate 203 is glued to the touch device 202 through the glue 104. The protective cover plate 203 includes a second locating surface 2031. The second locating surface 2031 is a cambered surface, and a structure of the second locating surface 2031 is the same as a structure of the first locating surface 2011, which is beneficial for adhesion to the first locating surface 2011. The structure of the second locating surface 2031 is not repeated here.

The second exemplary embodiment of the present disclosure provides a display device 200. Since the first locating surface 2011 and the second locating surface 2031 are tilted curved surfaces, these shapes play a positioning role, when the protective cover plate 203 is adhered to the surface shell 201. Dislocation can be prevented when the protective cover plate 203 is adhered to the surface shell 201, and accuracy of the sticking position can be ensured. In addition, as the first locating surface 2011 and the second locating surface 2031 are both cambered surfaces, the leakage of light in existing the surface shell and the protective cover plate using surface joint is prevented, and the user experience is improved.

Figure 5:
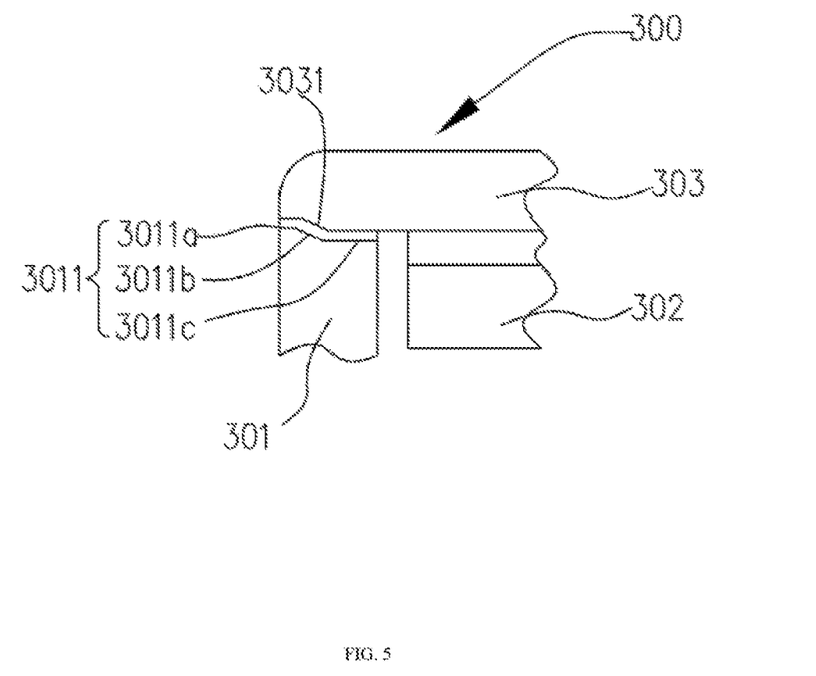
FIG. 5 is a structural diagram of the display device provided in a third exemplary embodiment of the present disclosure.

As shown in FIG. 5, a third exemplary embodiment of the present disclosure provides a display device 300. The display device 300 includes a surface shell 301, a touch device 302, and a protective cover plate 303. A difference between the third and first exemplary embodiments is that the surface shell 301 includes a first locating surface 3011, and the first locating surface 3011 is a stepped surface. The first locating surface 3011 can be CNC lathe-processed. Specifically, the first locating surface 3011 includes a first part 3011a, a second part 3011b, and a third part 3011c. The second part 3011b connects between the first part 3011a and the third part 3011c. Both of the first part 3011a and the third part 3011c are horizontal and the second part 3011b is inclined. An angle is formed between the second part 3011b and the first part 3011a, and an angle is formed between the second part 3011b and the third part 3011c, and the angle can be 135 degrees or 120 degrees.

The protective cover plate 303 is glued to the touch device 302 through the glue 104. The protective cover plate 303 includes a second locating surface 3031. The second locating surface 3031 and the first locating surface 3011 are adhered to each other. Structure of the second locating surface 2031 is the same as a structure of the first locating surface 2011, and thus is not repeated here.

The third exemplary embodiment of the present disclosure provides a display device 300, by setting the first locating surface 3011 and the second locating surface 3031 are stepped surface, which can play a positioning role, when the protective cover plate 303 and the surface shell 301 are brought together and attached to each other, phenomenon of dislocation can be prevented when the protective cover plate 203 sticks to the surface shell 201, accuracy of the sticking position can be ensured. In addition, as the first locating surface 2011 and the second locating surface 2031 are both stepped surface, thus it can be able to prevent the leakage of light in existing the surface shell with the protective cover plate using surface joint, and can improve an effect of user experience.

It can be understood that, in other exemplary embodiments, the first locating surface and the second locating surface according to the display device of the present disclosure can be tilted surfaces, that is to say the first locating surface and the second locating surface can tilted from the horizontal.

Compared with the prior art, the present disclosure provides the display device, arranging the first locating surface on the sidewall of the surface shell, and accordingly arranging the second locating surface on the protective cover plate. Both of the first locating surface and the second locating surface are curved surfaces, and through the locating effect of the second locating surface and the first locating surface, the protective cover plate and the surface shell can be accurately stuck to each other. Since both of the first locating surface and the second locating surface are curved surfaces, the curved surfaces play a positioning role in assembly. The dislocation or displacement caused by the protective cover plate and the surface shell being adhered to each other are avoided. In addition, leakage of light from the border of the surface shell is prevented when lights of the liquid crystal panel of the touch device reflect to the protective cover plate. Using a positioning structure on both the surface shell and on the protection cover plate provides a simple structure, and simplifies the assembly between parts.

In the end, it should be explained that, the above exemplary embodiments are for merely interpreting the technical solution of the present disclosure, but not for limiting the scope. Although certain of the aforementioned exemplary embodiments of the present disclosure have been specifically described, it will be understood by those of ordinary skill in the art that the technical solution of each aforementioned exemplary embodiment can still be modified or equivalents made of some of the technical characteristics. The essence of such modifications or replacement falls within the spirit and scope of the technical solution of each exemplary embodiment.

I claim:

1. A display device, comprising: a surface shell, a touch device and a protective cover plate, the surface shell comprising a bottom wall and a sidewall, the bottom wall and the sidewall forming a cavity, the sidewall comprising a first locating surface, the first locating surface being a curved surface, the touch device being set inside the cavity, the protective cover plate and the touch device being arranged to attach to each other, the protective cover plate comprising a second locating surface, the second locating surface being a curved surface, the second locating surface attaches to the first locating surface so that the protective cover plate and the surface shell are stuck to each other, both of the first locating surface and the second locating surface comprising a first part and a second part, the first part forming an angle with the second part, the touch device comprises a touch panel and a liquid crystal panel placed below the protective cover plate in sequence, and there are predetermined gaps between:

the protective cover plate and the touch panel,
between the touch panel and the liquid crystal panel, and between the liquid crystal and the surface shell,
the touch panel and the liquid crystal panel have a same width,
a predetermined gap exists between an exterior wall and a sidewall of the touch panel, and
the same predetermined gap exists between an exterior wall and a sidewall of the liquid crystal panel.

2. The display device of claim 1, wherein, a range of the predetermined gap is between 0.3 mm to 0.4 mm.

3. A terminal, the terminal comprising a display device, the display device comprising: a surface shell, a touch device and a protective cover plate, the surface shell comprising a bottom wall and a sidewall, the bottom wall and the sidewall forming a cavity, the sidewall comprising a first locating surface, the first locating surface being a curved surface, the touch device being set inside the cavity, the protective cover plate and the touch device being arranged to attach to each other, the protective cover plate comprising a second locating surface, the second locating surface being a curved surface, the second locating surface attaches to the first locating surface so that the protective cover plate and the surface shell are stuck to each other, both of the first locating surface and the second locating surface comprising a first part and a second part, the first part forming an angle with the second part, the touch device comprises a touch panel and a liquid crystal panel placed below the protective cover plate in sequence, and there are predetermined gaps between:

the protective cover plate and the touch panel,
between the touch panel and the liquid crystal panel, and between the liquid crystal and the surface shell,
the touch panel and the liquid crystal panel have a same width,
a predetermined gap exists between an exterior wall and a sidewall of the touch panel, and
the same predetermined gap exists between an exterior wall and a sidewall of the liquid crystal panel.

4. The terminal of claim 3, wherein, a range of the predetermined gap is between 0.3 mm to 0.4 mm.

* * * * *